(12) United States Patent
Kamimura et al.

(10) Patent No.: US 12,466,400 B2
(45) Date of Patent: Nov. 11, 2025

(54) VEHICLE TRAVEL CONTROL METHOD AND VEHICLE TRAVEL CONTROL DEVICE

(71) Applicant: Nissan Motor Co., Ltd., Yokohama (JP)

(72) Inventors: Hirotaka Kamimura, Kanagawa (JP); Yuji Nagasawa, Kanagawa (JP); Katsuhiko Degawa, Kanagawa (JP); Keiichi Yamamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/845,201

(22) PCT Filed: Mar. 18, 2022

(86) PCT No.: PCT/JP2022/012837
§ 371 (c)(1),
(2) Date: Sep. 9, 2024

(87) PCT Pub. No.: WO2023/175966
PCT Pub. Date: Sep. 21, 2023

(65) Prior Publication Data
US 2025/0100552 A1    Mar. 27, 2025

(51) Int. Cl.
*B60W 30/12*    (2020.01)

(52) U.S. Cl.
CPC ......... *B60W 30/12* (2013.01); *B60W 2552/20* (2020.02); *B60W 2552/30* (2020.02); *B60W 2556/40* (2020.02)

(58) Field of Classification Search
None
See application file for complete search history.

(56) References Cited

U.S. PATENT DOCUMENTS

| | | | |
|---|---|---|---|
| 6,226,573 B1 * | 5/2001 | Okawa | G05D 1/0282 701/25 |
| 8,385,600 B2 | 2/2013 | Nara et al. | |
| 11,097,748 B2 | 8/2021 | Zhang et al. | |
| 2010/0246889 A1 | 9/2010 | Nara et al. | |

(Continued)

FOREIGN PATENT DOCUMENTS

| | | |
|---|---|---|
| JP | 2007-164339 A | 6/2007 |
| JP | 2010-221859 A | 10/2010 |

(Continued)

*Primary Examiner* — David P. Merlino
(74) *Attorney, Agent, or Firm* — Young Basile Hanlon & MacFarlane, P.C.

(57) ABSTRACT

A vehicle travel control method including: determining whether or not a target travel route of a vehicle traveling on a first road is a route leading to a second road, the second road branching off from the first road; when the target travel route is a route leading to the second road, calculating a first trajectory linking a branch point at which a second link representing a lane shape of a second lane on the second road, branches off from a first link representing a lane shape of a first lane on the first road, and a point on the second link, the point being located a predetermined distance away from the branch point along the second link, and setting a target travel trajectory, based on the first trajectory; and controlling the vehicle to travel along the target travel trajectory.

4 Claims, 4 Drawing Sheets

(56) References Cited

U.S. PATENT DOCUMENTS

| | | |
|---|---|---|
| 2020/0073396 A1* | 3/2020 | Shimizu .............. G05D 1/0219 |
| 2020/0122721 A1 | 4/2020 | Zhang et al. |
| 2020/0247413 A1 | 8/2020 | Fukuda et al. |
| 2020/0284610 A1 | 9/2020 | Hatayama |
| 2024/0227852 A1* | 7/2024 | Molina Ramos ........................... B60W 30/18154 |

FOREIGN PATENT DOCUMENTS

| | | |
|---|---|---|
| JP | 2012-002753 A | 1/2012 |
| JP | 2019-215177 A | 12/2019 |
| JP | 2020-066428 A | 4/2020 |
| JP | 2020082772 A * | 6/2020 |

* cited by examiner

VEHICLE TRAVEL CONTROL METHOD AND VEHICLE TRAVEL CONTROL DEVICE

TECHNICAL FIELD

The present invention relates to a vehicle travel control method and a vehicle travel control device.

BACKGROUND

In JP 2020-66428 A described below, a technology for estimating a central line of a lane, using sensor information from a camera or the like and navigating an autonomous driving vehicle along a minimum cost route generated based on the central line is described.

SUMMARY

There are some cases where in a branch section in which a second road branches off from a first road, a travel path that exits to the second road from the first road is not clearly indicated by lane boundary lines. Thus, in some cases, a target travel trajectory of a vehicle traveling to the second road, which branches off from the first road, cannot be appropriately generated from sensor information. In this case, when a target travel trajectory is set based on map information representing a lane shape with a node and a link, there is a risk that rapid steering occurs depending on the lane shape of the second road, which branches off from the first road, and the passenger feels discomfort.

An object of the present invention is to suppress discomfort that a passenger feels when a vehicle traveling to a second road branching off from a first road is controlled by automatic steering, based on map information representing a lane shape with a node and a link.

According to an aspect of the present invention, there is provided a vehicle travel control method for causing a vehicle to travel along a lane by automatic steering, based on map information representing a lane shape with a node and a link, the vehicle travel control method causing a controller to perform processing including: determining whether or not a target travel route of the vehicle traveling on a first road is a route leading to a second road, the second road branching off from the first road ahead of the vehicle; when the target travel route is a route leading to the second road, calculating a first trajectory linking a branch point at which a second link, the second link being the link representing a lane shape of a second lane on the second road, branches off from a first link, the first link being the link representing a lane shape of a first lane on the first road, and a point on the second link, the point being located a predetermined distance away from the branch point along the second link, and setting a target travel trajectory, based on the first trajectory; and controlling the vehicle to travel along the target travel trajectory.

According to an aspect of the present invention, it is possible to suppress discomfort that a passenger feels when a vehicle traveling to a second road branching off from a first road is controlled by automatic steering, based on map information representing a lane shape with a node and a link.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION (Configuration)

Figure 1:
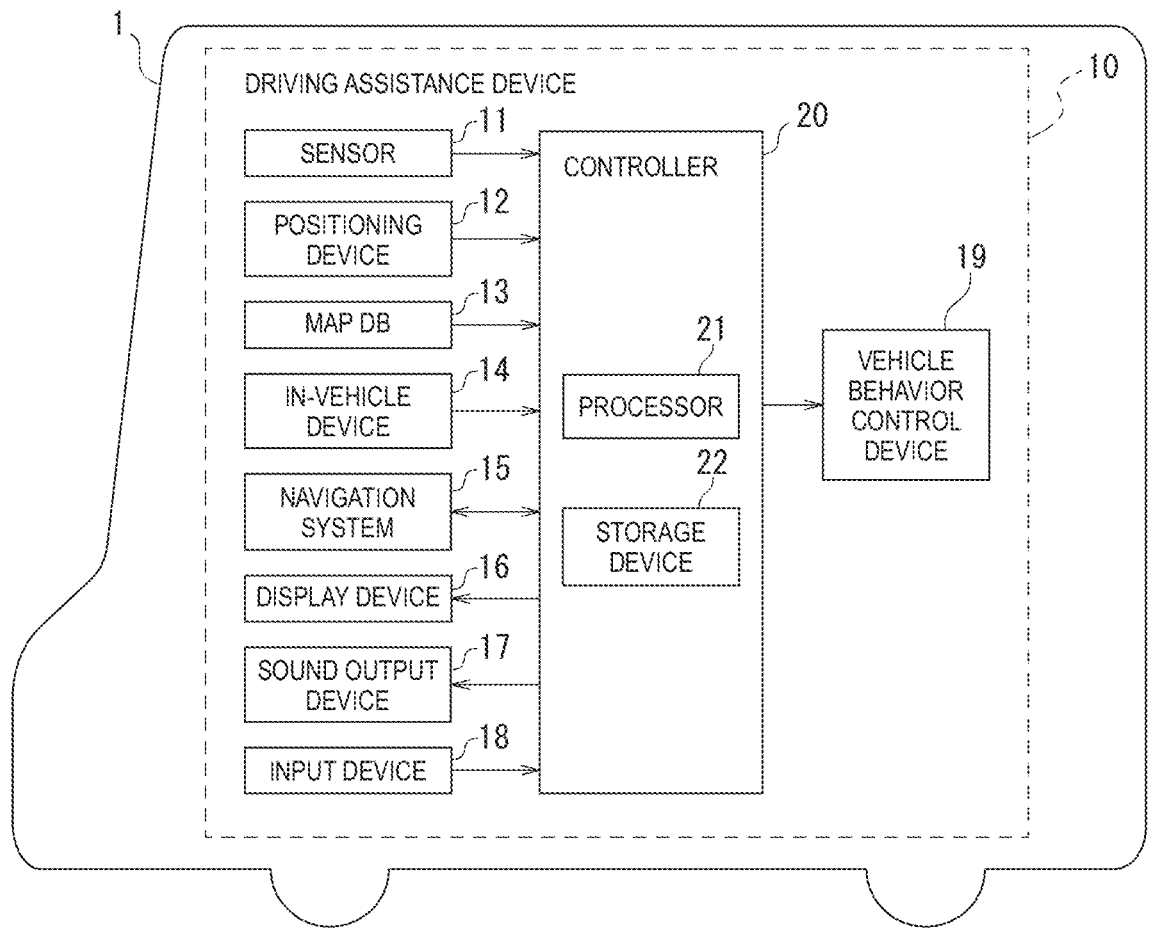
FIG. 1 is a diagram illustrative of an example of a schematic configuration of a vehicle on which a driving assistance device of an embodiment is mounted.

FIG. 1 is a diagram illustrative of an example of a schematic configuration of a vehicle on which a driving assistance device of an embodiment is mounted. A driving assistance device 10 mounted on an own vehicle 1 includes sensors 11, a positioning device 12, a map database (map DB) 13, in-vehicle devices 14, a navigation system 15, display devices 16, sound output devices 17, input devices 18, a vehicle behavior control device 19, and a controller 20. The above-described devices are connected to one another via, for example, a controller area network (CAN) or another in-vehicle LAN in order to perform transmission and reception of information with one another. The driving assistance device 10 is an example of a "vehicle travel control device" described in the claims.

The sensors 11 detect a travel state of the own vehicle 1. For example, the sensors 11 include cameras each of which captures an image of one of the front side, the rear side, and both lateral sides of the own vehicle 1. In addition, the sensors 11 include radars each of which detects an object existing on one of the front side, the rear side, and both lateral sides of the own vehicle 1. The sensors 11 include a vehicle speed sensor to detect vehicle speed of the own vehicle 1, a touch sensor to detect whether or not a passenger holds a steering wheel, a passenger monitor to capture an image of the passenger, and the like. The positioning device 12 includes a GPS unit, a gyro sensor, and the like. The positioning device 12 periodically acquires position information of the own vehicle 1 by the GPS unit. In addition, the positioning device 12 detects a current position of the own vehicle 1, based on the position information of the own vehicle 1, angle change information acquired from the gyro sensor, and vehicle speed acquired from the vehicle speed sensor.

The map database 13 is a memory that stores high-definition map information including position information of various types of facilities and specific points and that is configured to be accessible from the controller 20. The high-definition map information is map information in which detailed and highly precise position information of a curved road and the amount of curvature (for example, curvature or radius of curvature) thereof, a junction of roads, a branch point, a tollgate, a point of reduction in the number of lanes, and the like is associated with the map information as three-dimensional information.

Figure 2:
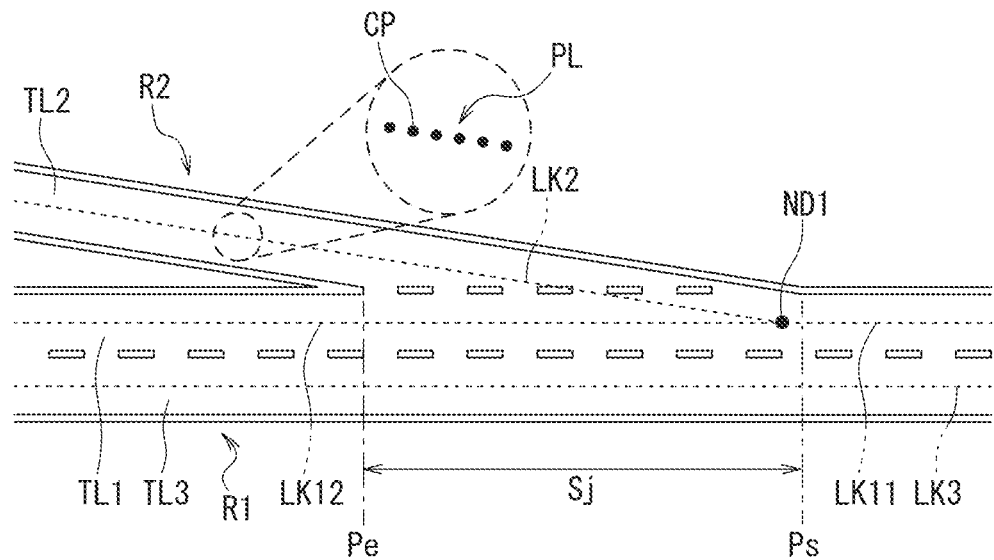
FIG. 2 is an explanatory diagram of high-definition map information stored in a map database in FIG. 1.

FIG. 2 is an explanatory diagram of the high-definition map information stored in the map database 13 in FIG. 1. The high-definition map information includes, as information in units of lanes (that is, lane information), information about nodes that indicate reference points on a lane reference line (for example, a center line in a lane) and information about links that indicate forms of lane sections between nodes. That is, the high-definition map information is map information that represents a lane shape by a plurality of nodes and a plurality of links that connect the nodes (in other words, represents a lane shape by connections of a plurality of links).

The example in FIG. 2 schematically illustrates an example of the high-definition map information representing lane shapes of lanes on a first road R1 and a second road R2. The first road R1 includes lanes TL1 and TL3, and the second road R2 includes a lane TL2. In the following description, the lane TL1 and the lane TL2 are referred to as "first lane TL1" and "second lane TL2", respectively.

The second road R2 is a road that branches off from the first road R1, and a section from a start point Ps at which branching of the second road R2 from the first road R1 starts to an end point Pe at which the branching ends is referred to as "branch section Sj". For example, the first road R1 may be a main lane of a motorway, such as an expressway, and the second road R2 may be a branch road branching off from the main lane.

The high-definition map information includes, as information representing lane shapes on the first road R1 and the second road R2, a node ND1 and links LK11, LK12, LK2, and LK3, each of the links being illustrated by a dashed line. In the following description, the link LK11, the link LK12, and the link LK2 are referred to as "first link LK11", "first link LK12", and "second link LK2", respectively. Each link is formed by a point sequence PL in which link constituent points CP representing reference points on a lane reference line (for example, a center line in a lane) are arranged. Therefore, a point sequence PL of link constituent points CP can represent not only a straight line-shaped link but also a curve-shaped link.

The first links LK11 and LK12 represent a lane shape of the first lane TL1 by indicating a lane central line of the first lane TL1 on the first road R1. The link LK3 represents a lane shape of the lane TL3 by indicating a lane central line of the lane TL3 on the first road R1. The second link LK2 represents a lane shape of the second lane TL2 by indicating a lane central line of the second lane TL2 on the second road R2. By the second link LK2 being connected to the node ND1 at which the first links LK11 and LK12 are connected to each other, a shape in which the second lane TL2 on the second road that branches off from the first road R1 is connected to the first lane TL1 on the first road R1 is represented.

FIG. 1 is now referred to. The in-vehicle devices 14 are various types of devices mounted on the own vehicle 1 and operate in accordance with operation performed by a passenger (for example, a driver). Examples of such in-vehicle devices include a steering wheel, an accelerator pedal, a brake pedal, turn signals, windshield wipers, lights, a horn, other specific switches, and the like.

The navigation system 15 acquires current position information of the own vehicle 1 from the positioning device 12 and, by superimposing the position of the own vehicle 1 on map information for navigation, displays the current position on a display or the like. In addition, the navigation system 15 performs navigation control to, when a destination is set, set a route from the current position of the own vehicle 1 to the destination as a target travel route and guide the passenger along the target travel route. In the navigation control, the navigation system 15 displays the target travel route on a map on the display and informs the passenger of the target travel route by voice or the like. The target travel route set by the navigation system 15 is also used in route travel assistance control performed by the controller 20. The route travel assistance control is control to cause the own vehicle 1 to autonomously travel along the target travel route.

The display devices 16 include various types of displays that are installed at positions at which the passenger can visually recognize the displays. The display devices 16 notify the passenger of various types of presented information in accordance with control performed by the controller 20. The sound output devices 17 are devices to output acoustic information, such as a speaker that the navigation system 15 includes, a speaker of an audio device, and a buzzer. The sound output devices 17 notify the passenger of various types of presented information in accordance with control performed by the controller 20.

The input devices 18 are devices, such as a button switch that enables the passenger to input an operation by manual operation, a touch panel arranged on a display screen, and a microphone that enables the passenger to input an operation by voice. The passenger can input setting information in response to the presented information presented by a display device 16 or a sound output device 17 by operating an input device 18.

Figure 3:
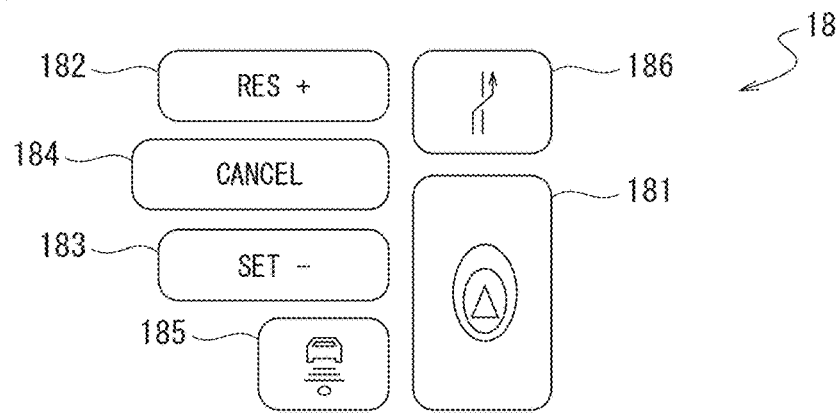
FIG. 3 is a diagram illustrative of some of input devices in FIG. 1.

FIG. 3 is a diagram illustrative of some of the input devices 18 of the present embodiment. The input devices 18 may be a button switch group that is arranged on, for example, a spoke of the steering wheel. The input devices 18 are used when turning-on and -off and the like of autonomous travel control performed by the controller 20 are set. The input devices 18 include a main switch 181, a resume/accelerate switch 182, a set/coast switch 183, a cancel switch 184, an inter-vehicle distance adjustment switch 185, and a lane change assistance switch 186. The main switch 181 is a switch to turn on and off the autonomous travel control performed by the controller 20. The resume/accelerate switch 182 is a switch to, after the autonomous travel control is turned off, set resumption of the autonomous travel control at a set speed before the turning-off of the autonomous travel control or to increase the set speed. The set/coast switch 183 is a switch to start the autonomous travel control. In order to start the autonomous travel control, after the autonomous travel control is turned on by the main switch 181, the set/coast switch 183 is pressed. The set/coast switch 183 is also a switch to reduce the set speed. The cancel switch 184 is a switch to cancel the autonomous travel control. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (approve) the start of the lane change. Note that, in addition to the button switch group illustrated in FIG. 3, a turn signal lever to turn on a turn signal and switches of other in-vehicle devices 14 can be used as the input devices 18.

FIG. 1 is now referred to. The vehicle behavior control device 19 controls vehicle behavior of the own vehicle 1. For example, when the own vehicle 1 performs constant speed travel at a set speed by the autonomous travel control, the vehicle behavior control device 19 controls operation of a drive mechanism and brake operation to achieve acceleration/deceleration and travel speed that enable the own vehicle 1 to travel at the set speed. In addition, when the own vehicle 1 travels following a preceding vehicle by the autonomous travel control, the vehicle behavior control device 19 also likewise controls the operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs autonomous steering control, which will be described later, by the autonomous travel control, the vehicle behavior control device 19 performs steering control of the own vehicle 1 by controlling operation of a steering actuator in addition to the operation control of the drive mechanism and the brake.

The controller 20 is one or a plurality of electronic control units (ECUs) for controlling travel of the own vehicle 1 and includes a processor 21 and peripheral components, such as a storage device 22. The processor 21 may be, for example, a CPU or an MPU. The storage device 22 may include a semiconductor storage device, a magnetic storage device, an optical storage device, or the like. The storage device 22 may include registers, a cache memory, and a memory, such as a ROM and a RAM, that is used as a main storage device. Functions of the controller 20, which will be described below, are achieved by, for example, the processor 21 executing computer programs stored in the storage device 22.

The controller 20 achieves a travel information acquisition function to acquire information relating to a travel state of the own vehicle 1 and performs autonomous travel control to autonomously control travel speed and/or steering of the own vehicle 1. The travel information acquisition function is a function to acquire travel information relating to a travel state of the own vehicle 1. For example, the controller 20 acquires, as the travel information, image information of the outside of the vehicle captured by the cameras in the sensors 11, a detection result by the radars therein, and vehicle speed information from the vehicle speed sensor therein. In the following description, the travel information acquired from the sensors 11 is sometimes referred to as "sensor information".

Further, the controller 20 acquires, as the travel information, the current position information of the own vehicle 1 from the positioning device 12. The controller 20 acquires, as the travel information, a set destination and a target travel route to the destination from the navigation system 15. The controller 20 acquires, as the travel information, map information, such as position information of a curved road and the amount of curvature (for example, curvature or radius of curvature) thereof, a junction of roads, a branch point, a tollgate, a point of reduction in the number of lanes, and the like and lane information, from the map database 13. The controller 20 acquires, as the travel information, information about operation of the in-vehicle devices 14 performed by the passenger from the in-vehicle devices 14.

In the autonomous travel control, the controller 20 autonomously controls travel of the own vehicle 1 without depending on operation performed by the passenger. The autonomous travel control includes autonomous speed control to autonomously control travel speed of the own vehicle 1 and autonomous steering control to autonomously control steering of the own vehicle 1.

In the autonomous speed control, when the controller 20 is detecting a preceding vehicle, the controller 20 controls the own vehicle 1 to travel following the preceding vehicle while performing inter-vehicle distance control in such a way as to keep inter-vehicle distance depending on vehicle speed, with a vehicle speed set by the passenger or a speed limit as an upper limit. In contrast, when the controller 20 is not detecting a preceding vehicle, the controller 20 controls the own vehicle 1 to perform constant speed travel at the vehicle speed set by the passenger or the speed limit. The former and the latter are also referred to as inter-vehicle distance control and constant speed control, respectively.

The constant speed control is performed when it is detected by a front view radar or the like in the sensors 11 that no preceding vehicle exists ahead of the own vehicle 1 in a lane in which the own vehicle 1 is traveling. In the constant speed control, the controller 20 controls operation of the drive mechanism, such as the engine and the brake, by the vehicle behavior control device 19 while feeding back vehicle speed data detected by the vehicle speed sensor in such a manner that the own vehicle 1 maintains a set travel speed. The inter-vehicle distance control is performed when it is detected by the front view radar or the like in the sensors 11 that a preceding vehicle exists ahead of the own vehicle 1 in the lane in which the own vehicle 1 is traveling. In the inter-vehicle distance control, the controller 20 controls operation of the drive mechanism, such as the engine and the brake, by the vehicle behavior control device 19 while feeding back inter-vehicle distance data detected by the front view radar in such a manner that the own vehicle 1 maintains a set inter-vehicle distance with the set travel speed as an upper limit.

In the autonomous steering control, the controller 20 performs the steering control of the own vehicle 1 by controlling operation of the steering actuator, based on the travel information acquired by the travel information acquisition function. The autonomous steering control includes lane-keeping control, lane change assistance control, passing assistance control, and the route travel assistance control.

In the lane-keeping control, the controller 20 assists steering wheel operation performed by the passenger by controlling the steering actuator in such a way that, for example, the own vehicle 1 travels substantially along the center of a lane.

In the lane change assistance control, when the passenger operates the turn signal lever, the controller 20 turns on a turn signal and determines whether or not a predetermined lane change start condition is established, based on various types of travel information acquired by the travel information acquisition function. The controller 20 starts the lane change operation when the lane change start condition is satisfied.

In the lane change operation, the controller 20 performs lane change manipulation to cause the own vehicle 1 to laterally move to an adjacent lane that is a lane change destination. While the controller 20 is performing the lane change operation, the controller 20 presents information indicating that the own vehicle 1 is automatically making a lane change, by a display device 16. When the lane change manipulation is finished, the controller 20 turns off the turn signal and starts performance of a lane-keeping function in the lane after lane change. The lane change manipulation is finished when, for example, the own vehicle 1 reaches within a predetermined distance from a lane center of the lane after lane change.

In the passing assistance control, when the controller 20 detects a preceding vehicle that is slower than the own vehicle 1 ahead of the own vehicle 1 in the lane in which the own vehicle 1 is traveling and a predetermined passing proposal condition is satisfied, the controller 20 proposes making a lane change by the autonomous travel control and passing the preceding vehicle, to the passenger. Hereinafter, a proposal to make a lane change to pass a preceding vehicle is sometimes referred to as "passing proposal". When the passenger approves the passing proposal by operating the lane change assistance switch 18b in the input devices 18 in response to the presentation of the passing proposal and a predetermined passing execution condition is satisfied, the controller 20 performs automated lane change. In the automated lane change, the controller 20 performs the lane change operation in such a way that the own vehicle 1 moves to an adjacent lane that is a lane change destination.

In the route travel assistance control, when a predetermined route travel proposal condition is satisfied at a point a predetermined distance before a travel direction change point, such as a branch point, a junction, an exit, and a tollgate, that exists on the target travel route set by the navigation system 15, the controller 20 proposes making a lane change by the autonomous travel control to cause the own vehicle 1 to travel along the target travel route, to the passenger. Hereinafter, a proposal to make a lane change to cause the own vehicle 1 to travel along the target travel route is sometimes referred to as "route travel proposal". When the passenger approves the route travel proposal by operating the lane change assistance switch 18b in the input devices 18 in response to the presentation of the route travel proposal and the predetermined route travel execution condition is satisfied, the controller 20 performs the automated lane change. In the automated lane change, the controller 20 performs the lane change operation in such a way that the own vehicle 1 moves to an adjacent lane that is a lane change destination.

In the above-described autonomous steering control, the controller 20 generates a target travel trajectory, based on sensor information acquired by detecting lane boundary lines ahead of the own vehicle 1 by the sensors 11 and lane information around the current position of the own vehicle 1 retrieved from the map database 13, based on a measurement result by the positioning device 12, and controls the own vehicle 1 to travel along the target travel trajectory. For example, the controller 20 performs image recognition processing on an image acquired by a camera in the sensors 11 capturing an image of a front view of the own vehicle 1 and thereby detects lane boundary lines.

However, there are some cases where in the branch section Sj, in which the second road R2 branches off from the first road R1, a travel path that exits to the second road R2 from the first road R1 is not clearly indicated by lane boundary lines.

For example, in the example in FIG. 2, in the branch section Sj, lane boundary lines existing on the right-hand and left-hand sides of the second lane TL2 are drawn in such a way that distance between the boundary lines gradually increases toward a branch exit. Thus, until the distance between the boundary lines increases to at least a distance greater than or equal to vehicle width of a vehicle, the lane boundary lines existing on the right-hand and left-hand sides of the second lane TL2 do not correctly display a travel path of a vehicle exiting to the second road R2 from the first road R1. In addition, in the branch section Sj, drawing of a lane boundary line between the second lane TL2 and the first lane TL1 is sometimes omitted.

Thus, when the controller 20 controls the own vehicle 1 to travel from the first road R1 to the second road R2 by the autonomous steering control, the controller 20 sometimes cannot appropriately generate a target travel trajectory from sensor information. In this case, when a target travel trajectory is set based on shapes of links in the high-definition map information stored in the map database 13, there is a risk that rapid steering occurs depending on the lane shape of the second lane TL2 on the second road R2, which branches off from the first road R1, and the passenger feels discomfort.

Accordingly, the controller 20 generates a target travel trajectory in such a way that the target travel trajectory becomes a trajectory that has a more gradual change in curvature than the second lane TL2 up to a point on the second lane TL2 located a predetermined distance away from a branch point between the first lane TL1 and the second lane TL2.

A specific example of a target travel trajectory will be described with reference to FIG. 4. The controller 20 calculates a trajectory (hereinafter, referred to as "shortcut trajectory") ST1 that links a branch point (that is, the node ND1) at which the second link LK2, which represents the lane shape of the second lane TL2 on the second road R2, branches off from the first links LK11 and LK12, which represent the lane shape of the first lane TL1 on the first road R1, and a link constituent point CP1 on the second link LK2 that is located a predetermined distance away from the node ND1 along the second link LK2. Note that when a point on the second link LK2 that is located a predetermined distance away from the node ND1 along the second link LK2 is another node ND2, the controller 20 may calculate a shortcut trajectory ST1 that links the node ND1 and the node ND2.

The controller 20 calculates the shortcut trajectory ST1 in such a way that the shortcut trajectory ST1, for example, has a straight line-shaped portion, and also smooths each of a connection part between the shortcut trajectory ST1 and the first link LK11 or LK12 and a connection part between the shortcut trajectory ST1 and the second link LK2 and thereby relaxes change in curvature of the shortcut trajectory ST1 at the connection parts. For example, the shortcut trajectory ST1 may be a trajectory that includes a straight line-shaped portion, a first relaxed curve portion formed between the straight line-shaped portion and the first links LK11 and LK12, and a second relaxed curve portion formed between the straight line-shaped portion and the second link LK2. The same applies to a shortcut trajectory ST2, which will be described later.

Figure 4:
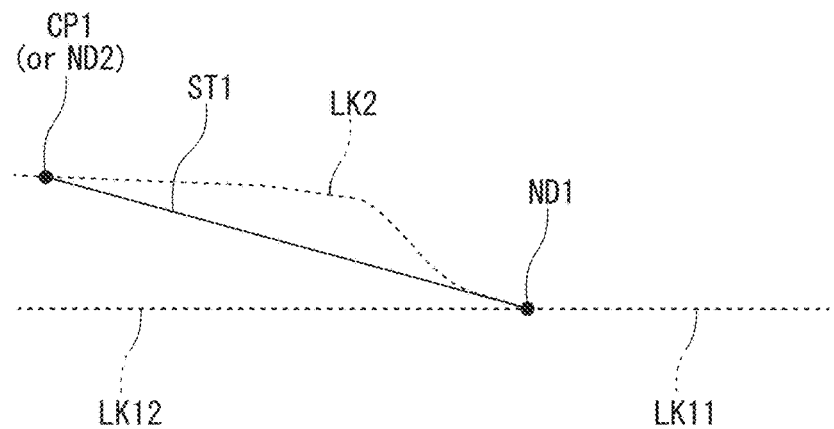
FIG. 4 is an explanatory diagram of an example of a vehicle travel control method of the embodiment.

As illustrated in FIG. 4, the shortcut trajectory ST1 is calculated in such a way that at least a portion of the shortcut trajectory ST1 passes, of areas on the left lateral side and the right lateral side of the second link LK2, an area on the first link LK11 side. By generating a target travel trajectory, based on the shortcut trajectory ST1 generated in this way, change in curvature of the target travel trajectory based on the shortcut trajectory ST1 can be made smaller than change in curvature in the case where a target travel trajectory is generated based on the shape of the second link LK2, and rapid steering can be prevented. As a result, it is possible to suppress discomfort that the passenger feels. Note that the shortcut trajectory ST1 is an example of a "first trajectory" described in the claims.

Figure 5:
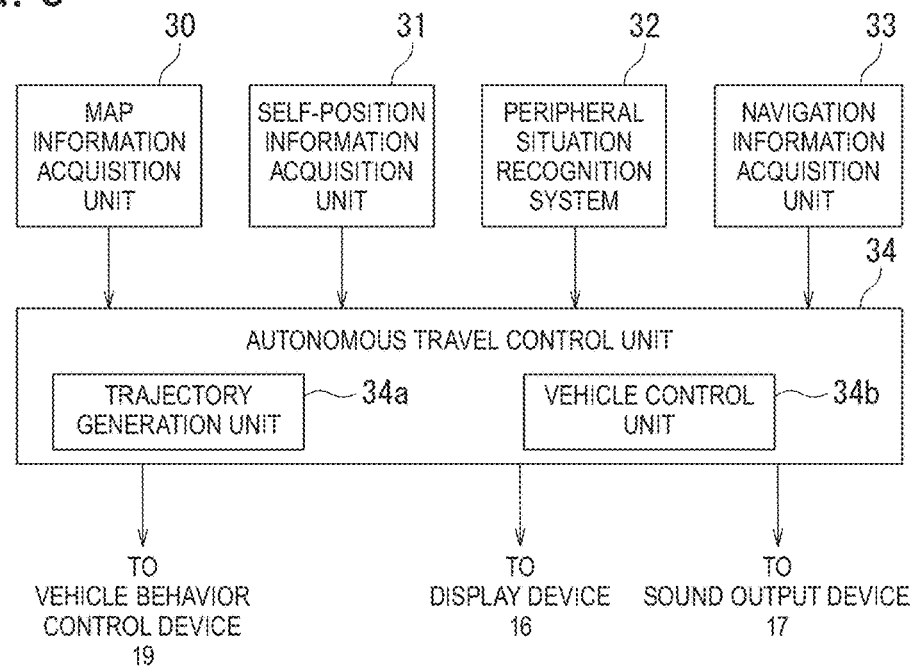
FIG. 5 is a block diagram of an example of a functional configuration of a controller in FIG. 1.

Next, with reference to FIG. 5, an example of a functional configuration of the controller 20 will be described. The controller 20 includes a map information acquisition unit 30, a self-position information acquisition unit 31, a peripheral situation recognition unit 32, a navigation information acquisition unit 33, and an autonomous travel control unit 34.

The map information acquisition unit 30 acquires high-definition map information from the map database 13 or by a not-illustrated communication device. The self-position information acquisition unit 31 acquires current position information relating to the current position of the own vehicle 1 from the positioning device 12. The peripheral situation recognition unit 32 recognizes a situation in the surroundings of the own vehicle 1, based on the travel information. The peripheral situation recognition unit 32 recognizes another vehicle around the own vehicle 1 and lane boundary lines in front of the own vehicle 1, based on the sensor information from the sensors 11. The navigation information acquisition unit 33 acquires route information relating to a target travel route to a destination from the navigation system 15.

The autonomous travel control unit 34 performs the above-described autonomous speed control (the constant speed control and the inter-vehicle distance control) and autonomous steering control (the lane-keeping control, the lane change control, the passing assistance control, and the route travel assistance control), based on the high-definition map information acquired by the map information acquisition unit 30, the current position information acquired by the self-position information acquisition unit 31, a recognition result by the peripheral situation recognition unit 32, and route information acquired by the navigation information acquisition unit 33.

For example, in the constant speed control, the autonomous travel control unit 34 controls the vehicle behavior control device 19 to maintain a set travel speed. In the inter-vehicle distance control, the autonomous travel control unit 34 controls the vehicle behavior control device 19 to maintain a set inter-vehicle distance with the set travel speed as an upper limit.

In addition, in the lane-keeping control, the autonomous travel control unit 34 controls the vehicle behavior control device 19 in such a way that the own vehicle 1 travels substantially along the center of a lane. In addition, in the lane change assistance control, when the passenger operates the turn signal lever, the autonomous travel control unit 34 turns on a turn signal and determines whether or not a predetermined lane change start condition is established. When the lane change start condition is satisfied, the autonomous travel control unit 34 controls the vehicle behavior control device 19 in such a way that the own vehicle 1 laterally moves to an adjacent lane that is a lane change destination.

In addition, in the passing assistance control, the autonomous travel control unit 34 presents a passing proposal to the passenger when a predetermined passing proposal condition is satisfied. When the passenger approves the passing proposal by operating the lane change assistance switch 186 in the input devices 18 and a predetermined passing execution condition is satisfied, the autonomous travel control unit 34 controls the vehicle behavior control device 19 in such a way that the own vehicle 1 makes a lane change.

In addition, in the route travel assistance control, the autonomous travel control unit 34 selects a lane (target lane) in which the own vehicle 1 is currently required to travel to travel along the target travel route, at a point a predetermined distance before a travel direction change point, such as a branch point, a junction, an exit, and a tollgate, that exists on the target travel route set by the navigation system 15. When a lane (current lane) in which the own vehicle is currently traveling and the target lane are different from each other, the autonomous travel control unit 34 proposes a route travel proposal to the passenger when a predetermined route travel proposal condition is satisfied. When the passenger approves the route travel proposal by operating the lane change assistance switch 186 in the input devices 18 and a predetermined route travel execution condition is satisfied, the autonomous travel control unit 34 controls the vehicle behavior control device 19 in such a way that the own vehicle 1 makes a lane change to the target lane.

In the above-described autonomous steering control, the autonomous travel control unit 34 generates a target travel trajectory and controls the vehicle behavior control device 19 in such a way that the own vehicle 1 travels along the target travel trajectory. For this purpose, the autonomous travel control unit 34 includes a trajectory generation unit 34a and a vehicle control unit 34b.

The trajectory generation unit 34a generates a target travel trajectory, based on the high-definition map information, the current position information, and a recognition result by the peripheral situation recognition unit 32. The vehicle control unit 34b controls the vehicle behavior control device 19 in such a way that the own vehicle 1 travels along the target travel trajectory generated by the trajectory generation unit 34a. For example, the vehicle control unit 34b may control the steering actuator or may provide a driving force difference or a braking force difference between a left wheel and a right wheel in such a way that the own vehicle 1 travels along the target travel trajectory.

For example, when recognition of lane boundary lines based on the sensor information from the sensors 11 is difficult, the trajectory generation unit 34a may generate a target travel trajectory, based on link shapes in the high-definition map information acquired by the map information acquisition unit 30. In addition, when the own vehicle 1 travels from the first road R1 to the second road R2, the trajectory generation unit 34a may generate a target travel trajectory, based on the link shapes in the high-definition map information acquired by the map information acquisition unit 30.

In addition, when, for example, lane boundary lines can be detected based on the sensor information and the own vehicle 1 continues to travel on the first road R1, the trajectory generation unit 34a may generates a target travel trajectory, based on a recognition result of the lane boundary lines based on the sensor information from the sensors 11. In addition, when, for example, after the own vehicle 1 travels from the first road R1 to the second road R2, a travel path of the own vehicle 1 becomes able to be recognized from a recognition result of the lane boundary lines on the right-hand and left-hand sides of the second lane TL2 on the second road R2, the trajectory generation unit 34a may generates a target travel trajectory, based on the recognition result of the lane boundary lines based on the sensor information from the sensors 11.

For example, the trajectory generation unit 34a may determine whether or not a lane change from the first lane TL1 on the first road R1 to the second lane TL2 on the second road R2 is to be made by the lane change assistance control or the route travel assistance control.

When a lane change from the first lane TL1 to the second lane TL2 is to be made, the trajectory generation unit 34a may, for example, start generation of a target travel trajectory based on the link shapes in the high-definition map information at a time point at which the own vehicle 1 has reached a point a first predetermined distance L1 before the branch start point Ps at which the second lane TL2 starts to branch off from the first lane TL1.

The vehicle control unit 34b may control the vehicle behavior control device 19 in such a way that the own vehicle 1 travels along the target travel trajectory generated based on the recognition result of the lane boundary lines recognized by the sensors 11 until the own vehicle 1 reaches a point a second predetermined distance L2 (<L1) before the branch start point Ps. The vehicle control unit 34b may control the vehicle behavior control device 19 in such a way that the own vehicle 1 travels along the target travel trajectory generated based on the link shapes in the high-definition map information after the own vehicle 1 passed the point the second predetermined distance L2 before the branch start point Ps. That is, the vehicle control unit 34b may switch the target travel trajectory to be used for the autonomous steering control from the target travel trajectory generated based on the recognition result of the lane boundary lines recognized by the sensors 11 to the target travel trajectory generated based on the link shapes in the high-definition map information at a time point at which the own vehicle 1 reaches the point the second predetermined distance L2 before the branch start point Ps.

When the own vehicle 1 reaches a point the first predetermined distance L1 before the branch start point Ps, the trajectory generation unit 34a calculates the shortcut trajectory ST1 described with reference to FIG. 4. That is, the trajectory generation unit 34a calculates a shortcut trajectory ST1 that links the node ND1 at which the second link LK2, which represents the lane shape of the second lane TL2 on the second road R2, branches off from the first links LK11 and LK12, which represent the lane shape of the first lane TL1 on the first road R1, and the link constituent point CP1 on the second link LK2 that is located a predetermined distance away from the node ND1 along the second link LK2.

Next, the trajectory generation unit 34a determines whether or not the shortcut trajectory ST1 is required to be corrected.

Figure 6:
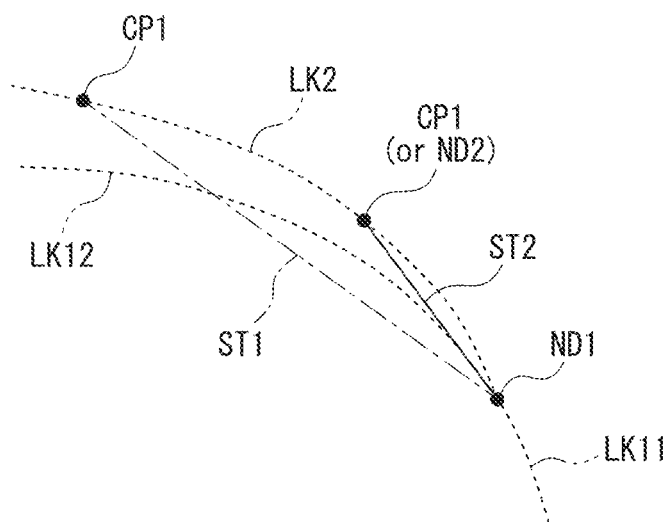
FIG. 6 is an explanatory diagram of an example of correction of a shortcut trajectory.

For example, as illustrated in FIG. 6, when the first link LK12 and the second link LK2 are curved in the same direction (that is, when the first lane TL1 and the second lane TL2 are curved in the same direction), the shortcut trajectory ST1 is sometimes a trajectory that crosses the first link LK12. When the own vehicle 1 travels along a target travel trajectory that is generated based on such a shortcut trajectory ST1, there is a risk that the passenger feels discomfort since the own vehicle 1 temporarily laterally moves to a direction opposite to a branch direction of the second lane TL2.

Thus, the trajectory generation unit 34a determines whether or not the shortcut trajectory ST1 is a trajectory crossing the first link LK12. When the shortcut trajectory ST1 is not a trajectory crossing the first link LK12, the trajectory generation unit 34a does not correct the shortcut trajectory ST1.

When the shortcut trajectory ST1 is a trajectory crossing the first link LK12, the trajectory generation unit 34a calculates a trajectory linking a link constituent point CP1 that serves as an intersection point of a tangent line to the first links LK11 and LK12 at the node ND1 and the second link LK2 and the node ND1 as a corrected shortcut trajectory ST2. When the intersection point of the tangent line to the first links LK11 and LK12 at the node ND1 and the second link LK2 is another node ND2, the trajectory generation unit 34a may calculate a corrected shortcut trajectory ST2 that links the node ND1 and the node ND2.

Next, the trajectory generation unit 34a determines whether or not a target travel trajectory is to be generated based on the shortcut trajectory ST1 or the corrected shortcut trajectory ST2.

For example, when change in curvature of the second link LK2 (that is, change in curvature of the second lane TL2) is small, there is a risk that when the own vehicle 1 travels along a target travel trajectory based on the shortcut trajectory ST1 or the corrected shortcut trajectory ST2, movement from the first road R1 to the second road R2 is delayed and the passenger feels discomfort.

Therefore, the trajectory generation unit 34a calculates a curvature difference between curvature of the first link LK11 and the curvature of the second link LK2 (that is, a curvature difference between curvature of the first lane TL1 and the curvature of the second lane TL2). When the curvature difference is greater than or equal to a predetermined threshold value, the trajectory generation unit 34a generates a target travel trajectory, based on the shortcut trajectory ST1 or the corrected shortcut trajectory ST2. In this case, when the shortcut trajectory ST1 is a trajectory crossing the first link LK12, the trajectory generation unit 34a generates a target travel trajectory, based on the corrected shortcut trajectory ST2, and when the shortcut trajectory ST1 is a trajectory not crossing the first link LK12, the trajectory generation unit 34a generates a target travel trajectory, based on the shortcut trajectory ST1.

When the curvature difference is less than the predetermined threshold value, the trajectory generation unit 34a generates a target travel trajectory, based on the shape of the second link LK2.

In addition, for example, there is a risk that the shortcut trajectory ST1 and the corrected shortcut trajectory ST2 become trajectories that cause the own vehicle 1 to deviate from the second lane TL2. That is, when the own vehicle 1 travels along a target travel trajectory based on the shortcut trajectory ST1 or the corrected shortcut trajectory ST2, there is a possibility that the own vehicle 1 crosses a lane boundary of the lane boundaries of the second lane TL2 that is located on the opposite side to the first lane TL1.

Figure 7:
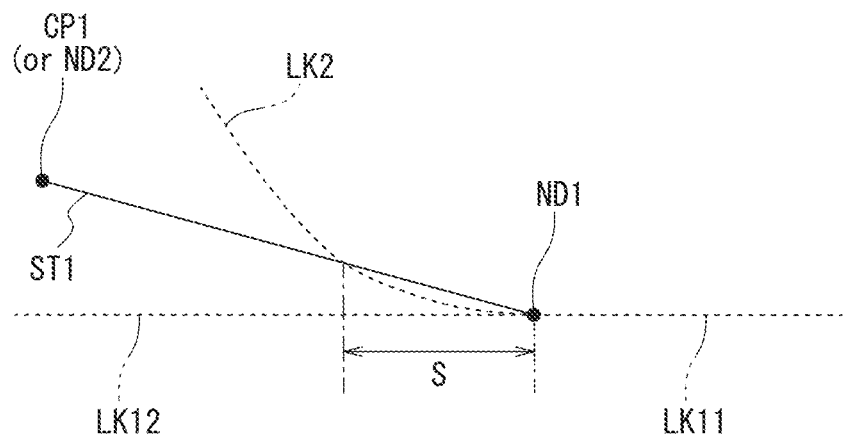
FIG. 7 is an explanatory diagram of an example of a case where no shortcut trajectory is used.

In an example of a shortcut trajectory ST1 in FIG. 7, the shortcut trajectory ST1 passes positions that are farther from the first link LK12 than the second link LK2 in a section S. Thus, when the own vehicle 1 travels along the shortcut trajectory ST1, there is a possibility that the own vehicle 1 crosses a lane boundary of the lane boundaries of the second lane TL2 that is located on the opposite side to the first lane TL1 in the section S.

Accordingly, when the shortcut trajectory ST1 is a trajectory not crossing the first link LK12, the trajectory generation unit 34a determines whether or not, when the own vehicle 1 travels along a target travel trajectory based on the shortcut trajectory ST1, the own vehicle 1 crosses a lane boundary of the lane boundaries of the second lane TL2 that is located on the opposite side to the first lane TL1. When the shortcut trajectory ST1 is a trajectory crossing the first link LK12, the trajectory generation unit 34a determines whether or not, when the own vehicle 1 travels along a target travel trajectory based on the corrected shortcut trajectory ST2, the own vehicle 1 crosses a lane boundary of the lane boundaries of the second lane TL2 that is located on the opposite side to the first lane TL1.

When the trajectory generation unit 34a determines that when the own vehicle 1 travels along a target travel trajectory based on the shortcut trajectory ST1 or the corrected shortcut trajectory ST2, the own vehicle 1 crosses a lane boundary of the lane boundaries of the second lane TL2 that is located on the opposite side to the first lane TL1, the trajectory generation unit 34a generates a target travel trajectory, based on the shape of the second link LK2.

When the shortcut trajectory ST1 is a trajectory not crossing the first link LK12 and, even when the own vehicle 1 travels along a target travel trajectory based on the shortcut trajectory ST1, the own vehicle 1 does not cross a lane boundary of the lane boundaries of the second lane TL2 that is located on the opposite side to the first lane TL1, the trajectory generation unit 34a generates a target travel trajectory, based on the shortcut trajectory ST1. When the shortcut trajectory ST1 is a trajectory crossing the first link LK12 and, even when the own vehicle 1 travels along a target travel trajectory based on the corrected shortcut trajectory ST2, the own vehicle 1 does not cross a lane boundary of the lane boundaries of the second lane TL2 that is located on the opposite side to the first lane TL1, the trajectory generation unit 34a generates a target travel trajectory, based on the corrected shortcut trajectory ST2.

(Operation)

Figure 8:
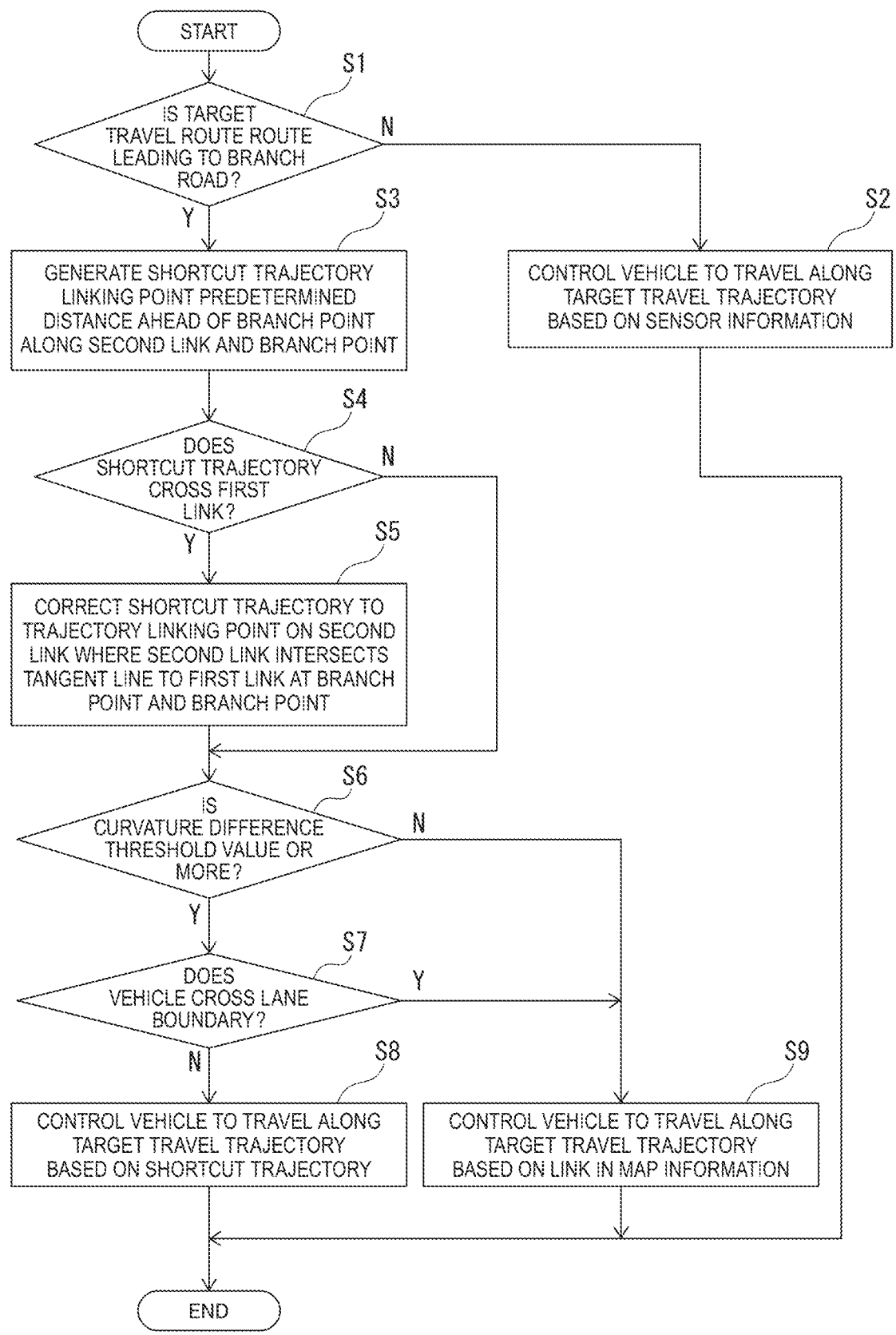
FIG. 8 is a flowchart of an example of the vehicle travel control method of the embodiment.

FIG. 8 is a flowchart of an example of a vehicle travel control method of the embodiment.

In step S1, the trajectory generation unit 34a determines whether or not a target travel route of the own vehicle 1 is a route that leads to a branch road. When the target travel route is a route that leads to a branch road (step S1: Y), the process proceeds to step S3. When the target travel route is not a route that leads to a branch road (step S1: N), the process proceeds to step S2.

In step S2, the trajectory generation unit 34a generates a target travel trajectory, based on a recognition result of lane boundary lines based on sensor information from the sensors 11. The vehicle control unit 34b controls the vehicle behavior control device 19 in such a way that the own vehicle 1 travels along the target travel trajectory generated by the trajectory generation unit 34b. Subsequently, the process terminates.

In step S3, the trajectory generation unit 34a calculates a shortcut trajectory ST1 that links a node ND1 at which a second link LK2 branches off from first links LK11 and LK12 and a point on the second link LK2 that is located a predetermined distance away from the node ND1 along the second link LK2.

In step S4, the trajectory generation unit 34a determines whether or not the shortcut trajectory ST1 crosses the first link LK12. When the shortcut trajectory ST1 crosses the first link LK12 (step S4: Y), the process proceeds to step S5. When the shortcut trajectory ST1 does not cross the first link LK12 (step S4: N), the process proceeds to step S6.

In step S5, the trajectory generation unit 34a calculates a trajectory linking an intersection point of a tangent line to the first links LK11 and LK12 at the node ND1 and the second link LK2 and the node ND1 as a corrected shortcut trajectory ST2. Subsequently, the process proceeds to step S6.

In step S6, the trajectory generation unit 34a determines whether or not a curvature difference between curvature of a first lane TL and curvature of a second lane TL2 is greater than or equal to a threshold value. When the curvature difference is greater than or equal to the threshold value (step S6: Y), the process proceeds to step S7. When the curvature difference is not greater than or equal to the threshold value (step S6: N), the process proceeds to step S9.

In step S7, the trajectory generation unit 34a determines whether or not, when the own vehicle 1 travels along a target travel trajectory based on the shortcut trajectory ST1 (when the corrected shortcut trajectory ST2 is calculated, the corrected shortcut trajectory ST2), the own vehicle 1 crosses a lane boundary of the lane boundaries of the second lane TL2 that is located on the opposite side to the first lane TL1. When the own vehicle 1 crosses the lane boundary (step S7: Y), the process proceeds to step S9. When the own vehicle 1 does not cross the lane boundary (step S7: N), the process proceeds to step S8.

In step S8, the trajectory generation unit 34a generates a target travel trajectory, based on the shortcut trajectory ST1 (when the corrected shortcut trajectory ST2 is calculated, the corrected shortcut trajectory ST2). The vehicle control unit 34b controls the vehicle behavior control device 19 in such a way that the own vehicle 1 travels along the target travel trajectory generated by the trajectory generation unit 34b. Subsequently, the process terminates.

In step S9, the trajectory generation unit 34a generates a target travel trajectory, based on a link shape of the second link LK2. The vehicle control unit 34b controls the vehicle behavior control device 19 in such a way that the own vehicle 1 travels along the target travel trajectory generated by the trajectory generation unit 34b. Subsequently, the process terminates.

(Advantageous Effects of Embodiment)

(1) A controller 20 causes an own vehicle 1 to travel along a lane by automatic steering, based on map information representing a lane shape with a node and a link. The controller 20 performs processing including: determining whether or not a target travel route of the own vehicle 1 traveling on a first road is a route leading to a second road, the second road branching off from the first road ahead of the own vehicle 1; when the target travel route is a route leading to the second road, calculating a first trajectory linking a branch point at which a second link, the second link being the link representing a lane shape of a second lane on the second road, branches off from a first link, the first link being the link representing a lane shape of a first lane on the first road, and a point on the second link, the point being located a predetermined distance away from the branch point along the second link, and setting a target travel trajectory, based on the first trajectory; and controlling the own vehicle 1 to travel along the target travel trajectory.

Because of this configuration, change in curvature of the target travel trajectory based on the first trajectory can be made smaller than change in curvature in the case where a target travel trajectory is generated based on the shape of the second link, and rapid steering can be prevented. As a result, it is possible to suppress discomfort that the passenger feels.

(2) The controller 20 may determine whether or not the first trajectory crosses the first link, when the first trajectory does not cross the first link, set a target travel trajectory, based on the first trajectory, and, when the first trajectory crosses the first link, set the target travel trajectory, based on a second trajectory linking an intersection point of a tangent line to the first link at the branch point and the second link and the branch point.

Because of this configuration, when the own vehicle 1 travels along a target travel trajectory based on the first trajectory, discomfort that the passenger feels due to the own vehicle 1 laterally moving to a direction opposite to a branch direction of the second lane can be suppressed.

(3) The controller 20 may, when a curvature difference between curvature of the first lane and curvature of the second lane is greater than or equal to a predetermined threshold value, control the own vehicle 1 to travel along the target travel trajectory, and, when the curvature difference is less than the threshold value, control the own vehicle 1 to travel along a travel trajectory generated based on the second link.

Because of this configuration, discomfort that the passenger feels due to movement from the first road R1 to the second road R2 being delayed when the own vehicle 1 travels along a target travel trajectory based on the first trajectory or the second trajectory can be suppressed.

(4) The controller 20 may estimate whether or not the own vehicle 1 crosses a lane boundary of lane boundaries of the second lane, the lane boundary being located on an opposite side to the first lane, when the own vehicle 1 travels along the target travel trajectory, and, when estimating that the own vehicle 1 crosses the lane boundary, control the own vehicle 1 to travel along a travel trajectory generated based on the second link.

Because of this configuration, it is possible to prevent the own vehicle 1 that travels along a target travel trajectory based on the first trajectory or the second trajectory from deviating from the second lane to the opposite side to the first lane.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Driving assistance device
11 Sensor
12 Positioning device
13 Map DB
14 In-vehicle device
15 Navigation system
16 Display device
17 Sound output device
18 Input device
19 Vehicle behavior control device
20 Controller

The invention claimed is:

1. A vehicle travel control method for causing a vehicle to travel along a lane by automatic steering, based on map information representing a lane shape with a node and a link, the vehicle travel control method causing a controller to perform processing, the vehicle travel control method comprising:
  determining whether or not a target travel route of the vehicle traveling on a first road is a route leading to a second road, the second road branching off from the first road ahead of the vehicle;
  when the target travel route is a route leading to the second road, determining a point on a second link, the second link being the link representing a lane shape of a second lane on the second road that branches off from a first link at a branch point, the first link being the link representing a lane shape of a first lane on the first road, the point determined on the second link being located a predetermined distance away from the branch point along the second link;
  calculating a first trajectory linking the branch point and the point determined on the second link;
  setting a target travel trajectory based on the first trajectory;
  determining whether or not the first trajectory crosses the first link;
  when the first trajectory does not cross the first link, setting the target travel trajectory based on the first trajectory;
  when the first trajectory crosses the first link, setting the target travel trajectory based on a second trajectory linking an intersection point of a tangent line to the first link at the branch point and the second link and the branch point; and
  controlling the vehicle to travel along the target travel trajectory.

2. The vehicle travel control method according to claim 1, further comprising:
  when a curvature difference between a curvature of the first lane and curvature of the second lane is greater than or equal to a predetermined threshold value, controlling the vehicle to travel along the target travel trajectory; and
  when the curvature difference is less than the predetermined threshold value, controlling the vehicle to travel along a travel trajectory generated based on the second link.

3. The vehicle travel control method according to claim 1, further comprising:
  estimating whether or not the vehicle crosses a lane boundary of lane boundaries of the second lane, the lane boundary being located on an opposite side to the first lane, when the vehicle travels along the target travel trajectory; and
  when estimating that the vehicle crosses the lane boundary, controlling the vehicle to travel along a travel trajectory generated based on the second link.

4. A vehicle travel control device configured to cause a vehicle to travel along a lane by automatic steering, based on map information representing a lane shape with a node and a link, the vehicle travel control device comprising a controller configured to perform processing comprising:
  determining whether or not a target travel route of the vehicle traveling on a first road is a route leading to a second road, the second road branching off from the first road ahead of the vehicle;
  when the target travel route is a route leading to the second road, determininng a point in a second link, the second link being the link representing a lane shape of a second lane on the second road that branches off from a first link at a branch point, the first link being the link representing a lane shape of a first lane on the first road, the point determined on the second link being located a predetermined distance away from the branch point along the second link;
  calculating a first trajectory linking the branch point and the point determined on the second link;
  setting a target travel trajectory based on the first trajectory;
  determining whether or not the first trajectory crosses the first link;
  when the first trajectory does not cross the first link, setting the target travel trajectory based on the first trajectory;

when the first trajectory crosses the first link, setting the target travel trajectory based on a second trajectory linking an intersection point of a tangent line to the first link at the branch point and the second link and the branch point; and controlling the vehicle to travel along the target travel trajectory.

\* \* \* \* \*